US 6,655,863 B2

United States Patent
Lin (10) Patent No.: US 6,655,863 B2
(45) Date of Patent: Dec. 2, 2003

(54) PEN-SIZED KEYBOARD ARRANGEMENT (75) Inventor: Shi-Yu Lin, Shulin (TW)

(73) Assignee: L&K Precision Industrial Co., Ltd., Taipei Hsien (TW)

(*) Notice: Subject to any disclaimer, the term of this patent is extended or adjusted under 35 U.S.C. 154(b) by 216 days.

(21) Appl. No.: 09/922,566

(22) Filed: Aug. 3, 2001

(65) Prior Publication Data
US 2003/0025668 A1 Feb. 6, 2003

(51) Int. Cl.[7] .................................................. B41J 5/00
(52) U.S. Cl. .................... 400/491; 400/472; 400/491.1; 400/479; 341/22; 345/168; 345/169
(58) Field of Search ................................. 400/472, 491, 400/491.1, 492, 479; 341/22; 345/168, 169

(56) References Cited

U.S. PATENT DOCUMENTS

| | | | | |
|---|---|---|---|---|
| 5,220,521 A | * | 6/1993 | Kikinis | 708/138 |
| 5,616,897 A | * | 4/1997 | Weber et al. | 200/5 A |
| 5,742,241 A | * | 4/1998 | Crowley et al. | 341/22 |
| 6,168,331 B1 | * | 1/2001 | Vann | 400/472 |
| 6,178,619 B1 | * | 1/2001 | Tai | 29/622 |
| 6,265,993 B1 | * | 7/2001 | Johnson | 341/22 |
| 6,547,463 B1 | * | 4/2003 | Loo | 400/472 |

* cited by examiner

Primary Examiner—Andrew H. Hirshfeld
Assistant Examiner—Dave A. Ghatt
(74) Attorney, Agent, or Firm—Pro-Techtor Int'l Services (57) ABSTRACT A pen-sized keyboard arrangement of the present invention comprises a flexible keyboard member, a rolling mechanism and an electrical connection unit. The rolling mechanism includes a base and an elongated rolling pole pivotally connected to the base. The rolling mechanism defines a longitudinally extending an elongated groove. One end of the rolling mechanism is pivotally connected to the base. The other end thereof is used for being rotated by a user for rolling in and pull out the flexible keyboard member. The flexible keyboard member includes a buffer for absorbing the deformation of the flexible keyboard member when the flexible keyboard member is rolled in or pulled out. The rotating mechanism can rotate the electrical connection unit about a desired angle for being properly viewed by a user. Such a keyboard arrangement is apparently easy for being carried and provides a large area for each key-press thereby facilitating a rotating operation by a user.

18 Claims, 12 Drawing Sheets

PEN-SIZED KEYBOARD ARRANGEMENT

FIELD OF THE INVENTION

The present invention relates to a keyboard arrangement, especially a pen-sized keyboard arrangement which is convenient to carry, and can be directly connected to information devices, such as a mobile phone, a personal digital assistant (PDA), or a computer.

BACKGROUND OF THE INVENTION

To follow the trend of miniaturization in design, an information product should become more and more compact. Therefore, any corresponding component used within such a product is required to reduce its dimension as mush as possible. A personal digital assistant (PDA), for example, is easy to carry and emphasizes its multi-function and humanization transmission interface thereby facilitating personal finance management and access to everyday life information and news. In fact, a PDA is becoming a new favorite among all kinds of information products. Furthermore, with the fast improvement of Internet and communication technology, a long-distance information transmission and communication becomes increasingly easy. A mobile phone thus should provide more and better functions to meet requirements of feasibility and portability than just audio transmission.

However, those above-mentioned compact PDA and mobile phone have small-size input/output keys which are inconvenient for pressing, and a user may therefore make a lot of mistakes when typing. Especially at present those keys on the PDA and the mobile phone are not many enough for typing a large amount of words at a reasonable rate, such as drafting email or writing a cahier. Even if the PDA and the mobile phone had enough number of keys, a user would feel very hard to press those small keys.

OBJECTS OF THE INVENTION

The first object of the present invention is to provide a pen-sized keyboard which can efficiently roll in a large-sized flexible keyboard member and receive the keyboard member within a pen-sized housing. When rolled in, the keyboard member is small enough for being conveniently carried. When rolled out, the keyboard member is large enough for typing a large number of words.

The second object of the present invention is to provide a small-size keyboard which can be attached to a coat or other things thereby providing an effect of portability.

To achieve the above objects, the present invention is featured in that the pen-sized keyboard arrangement includes a rolling mechanism for rolling in and pulling out a flexible keyboard member. The rolling mechanism includes a base, a rolling pole pivotally connected to the base, and a housing with a cavity inside. The rolling pole defines an elongated longitudinally extending groove for securing an edge of the flexible keyboard member. One end of the rolling pole is pivotally connected to the base, and the other end thereof is connected to the receiving member for being actuated by a hand.

Furthermore, another feature of the present invention lies in that the pen-sized keyboard arrangement includes a buffer for absorbing the deformation of the flexible keyboard member when being rolled thereby reliably and smoothly rolling in and receiving the keyboard member within the housing.

Again, the third feature of the present invention lies in that the pen-sized keyboard arrangement further includes an electrical connection unit for connecting the keyboard member to the PDA, the mobile phone, and other small size information products. The electrical connection unit includes a connector.

The fourth feature of the present invention lies in that a rotating mechanism is positioned between the receiving member and the electrical connection unit. The rotating mechanism can rotate the electrical connection unit about a desired angle for being covered when the electrical connection is not being used, or about a certain angle relative to the housing for being properly connected to a PDA or a mobile phone thereby providing a proper view angle for a user.

BRIEF DESCRIPTION OF THE DRAWINGS

Other features and advantages of the present invention will become apparent in the following detailed description of the preferred embodiments with reference to the accompanying drawings of which.

DETAILED DESCRIPTION OF THE PREFERRED EMBODIMENT

Figure 1:
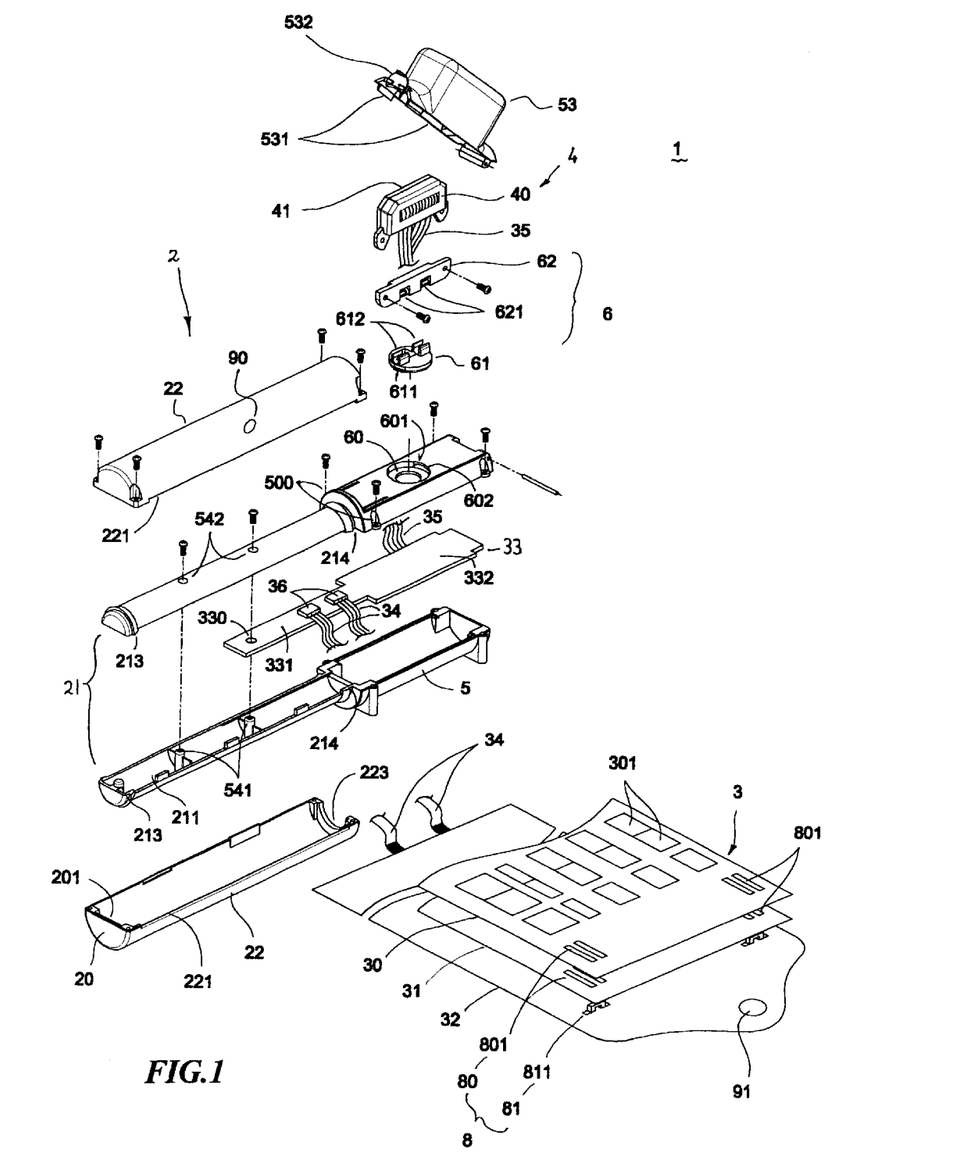
FIG. 1 is an exploded view of a pen-sized keyboard arrangement of the present invention.
Figure 2:
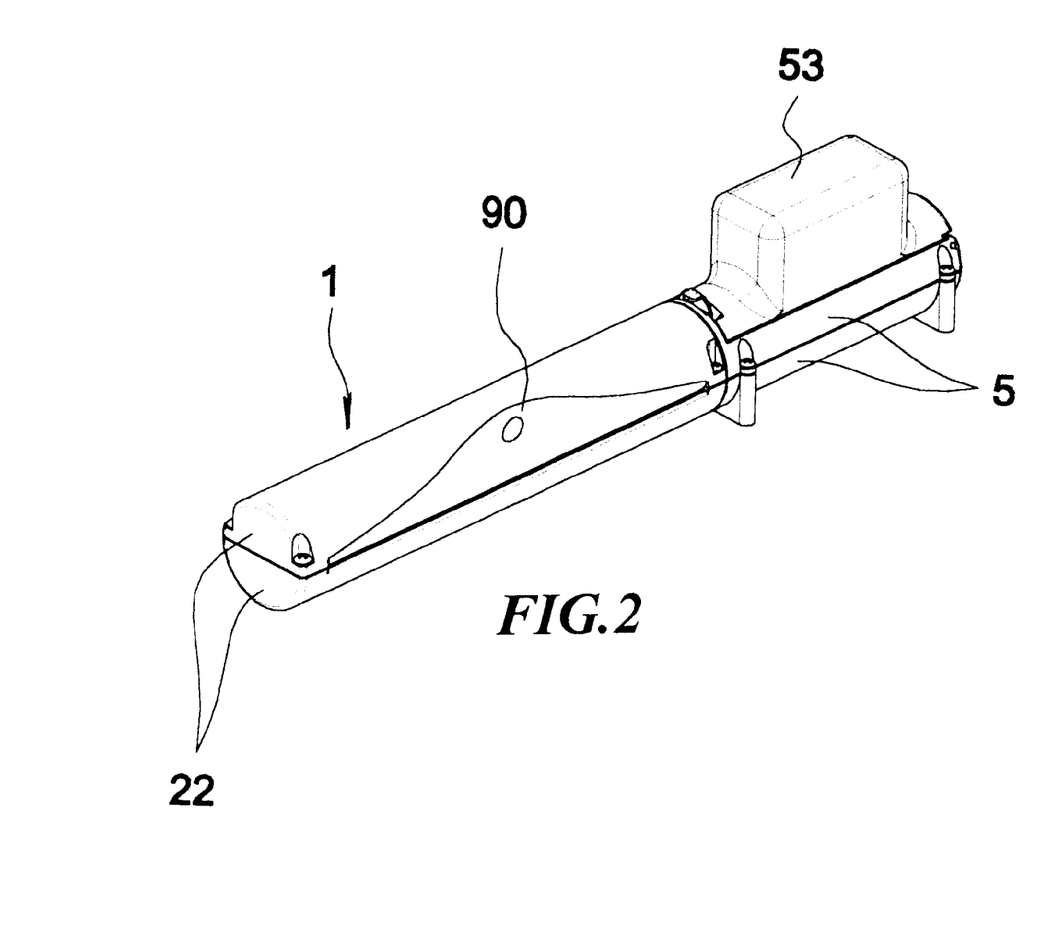
FIG. 2. is an assembled view of FIG. 2.

Referring to FIG. 1, and FIG. 2, a pen-sized keyboard arrangement 1 of the present invention comprises a rolling mechanism 2, a keyboard member 3, an electrical connection unit 4, a receiving member 5, and a rotating mechanism 6. The rolling mechanism includes a base 20, a rolling pole 21 pivotally connected to the base 20, and a cylinder-sized housing 22 with an elongated cavity inside pivotally connected to the base 20. The rolling pole 21 has an elongated cavity inside and defines an elongated longitudinally extending groove 211 therein. The rolling pole 21 and the receiving member 5 integratedly formed with the rolling pole 21 includes a pair of longitudinally divided halves. In assembly, a plurality of screws is put into the receiving member halves for an assembly purpose. A plurality of screws is correspondingly put into the assembling holes 542 and the assembling poles 541 formed on the rolling pole 21 to secure the halves together thereby forming the rolling pole 21 and the receiving member 5. A neck portion 214 is formed between the rolling pole 21 and the receiving member 5. A neck portion 213 is formed at one end of the rolling pole 21 away from the neck portion 214. The cavity longitudinally extends inside of the cylinder-sized housing 22. A pair of openings is defined at opposite ends of the housing 22. An assembling slot 221 is longitudinally defined along the housing 22 corresponding to the elongated groove 211 of the rolling pole 21. One end of housing 22 is integratedly formed with the base 20, the other end of the housing 22 defines an opening 223. The housing 22 includes a pair of halves secured together by a plurality of screws. The opening 223 is assembled to the neck portion 214 between the rolling pole 21 and the receiving member 5. An engaging slot 201 is defined in the base 20 for pivotally connecting to the neck portion 213 of the rolling pole 21.

Figure 4:
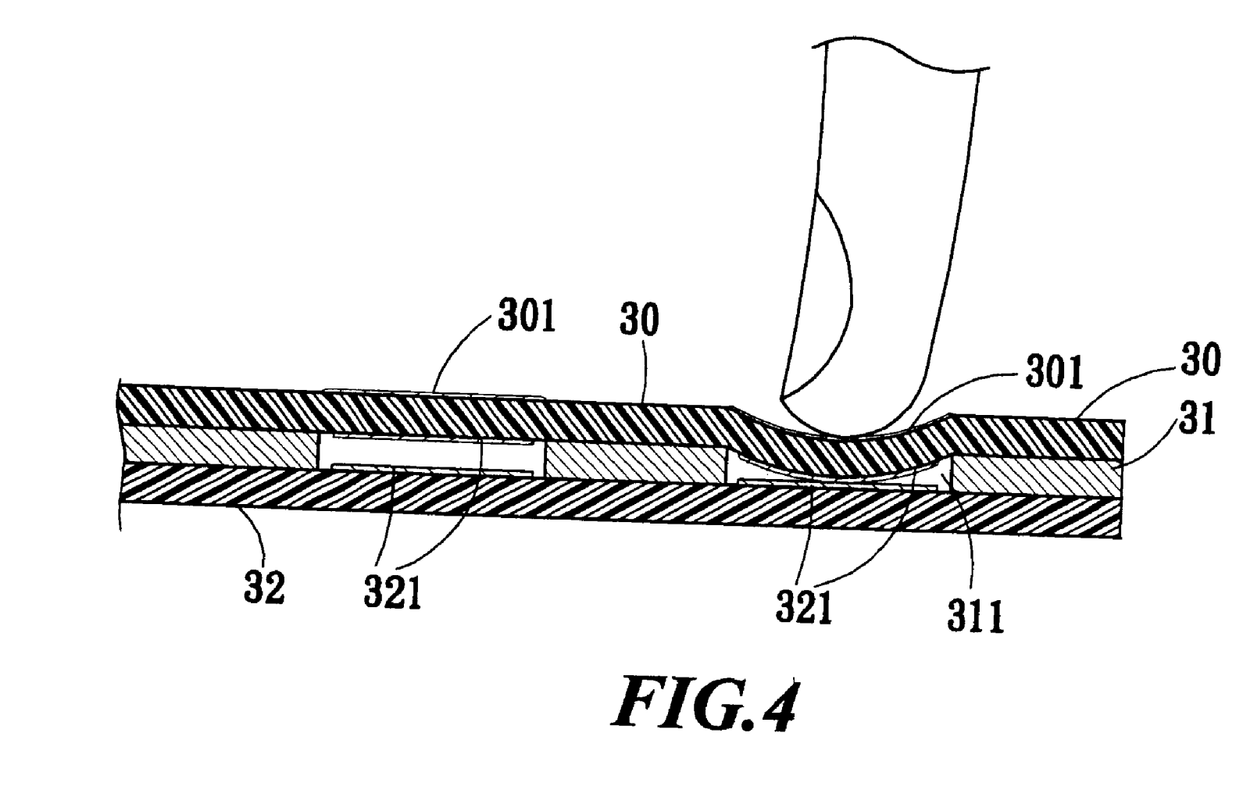
FIG. 4 is a cross-sectional view taken from line A—A of FIG. 3.

Referring to FIG. 1 and FIG. 4, the keyboard member 3 includes an upper flexible printed circuit board (PCB) 30, a film 31, a lower flexible PCB 32, and a mother board 33 electrically connected to the upper and lower flexible PCB 30, 32. The upper flexible substrate 30, the film 31 and the lower flexible PCB 32 are closely attached together with one above the other. A plurality of key-presses 301 is printed on the flexible PCB 30. The film 31 is positioned between the flexible PCB 30 and the flexible PCB 32. Those three parts are flexible and can be rolled and unrolled. A plurality of electronic touch pads 321 is positioned on the flexible PCB 30, 32, corresponding to the key-presses 301. A plurality of holes 311 is defined in the film 31, corresponding to touch pads 321. When the key-presses 301 are pressed, the corresponding touch pads 321 are electrically connected.

A buffer 8 is positioned adjacent to one edge of each of the PCB 30, 32 and the film 31. The buffer 8 includes a plurality of positioning slide grooves 80 and a plurality of lead portions 81. The slide grooves 80 are a pair of side-by-side-arranged longitudinally elongated slot 801 defined in the flexible PCB 30 and the film. The lead portions 81 are a pair of L-shaped tabs 811 upwardly formed on the lower flexible PCB 32. The pair of tabs 811 upwardly extends through the elongated slot 801 of the flexible PCB 30 and the film 31. The tabs 811 laterally extend toward each other above the flexible PCB 30 and are deformed to be a bridge structure thereby being positioned above the flexible PCB 30. The upper and lower PCB 30, 32 and the film 31 then can only move in a direction in which the upper and lower PCB 30, 32 and the film 31 are rolled and unrolled. Therefore, when being rolled in, the deformation made by each flexible layer (the upper and lower PCB 30, 32 and the film 31) can be absorbed by the slide grooves 80 so that the flexible layer can be reliably and properly rolled in.

Referring back to FIG. 1, the mother board 33 includes a front portion 331 and a rear portion 332. The front portion 331 defines an assembling opening 330. The assembling opening 330 is engaged with one of the assembling poles 541 of the rolling pole 21. The front portion 331 is received within the cavity of the rolling pole 21. A pair of connectors 36 is positioned on the front portion 331 of the mother board 33 and is electrically connected to the upper and lower flexible PCB 30, 32 by means of a flat cable 34. The rear portion 332 is received within the receiving member 5 and is electrically connected to a connector 40 and a circuit board 41 of the electrical connection unit 4 by means of an electrical wire 35.

The rotating mechanism 6 includes a depressed base 60, a rotating plate 61, and a supporter 62. The depressed base 60 is defined in the receiving member 5. A lead indentation 601 and a stopper 602 are formed inside the depressed base 60. The rotating plate 61 is pivotally engaged with the depressed base 60 and can be rotated along the lead indentation 601. The rotating plate 61 includes a protruding portion 611 for engaging with the stopper 602 and a pair of passageways 612 for pivotally connecting the supporter 62. A stopping portion 613 (see FIG. 6B) is formed adjacent to the passageways 612 and a center of the rotating plate 61. The supporter 62 is used to fix the electrical connection unit 4, and includes a pair of pivotal poles 621 for pivotally connecting the passageways 612 of the rotating plate 6 and a locking portion 622 extending from a side thereof. When the pivotal poles 621 pivotally connect the passageways 612 and the locking portion 622 engages with the stopping portion 613, the supporter 62 rotates the electrical connection unit 4 about a desired angle for connecting with a PDA 70 (see FIG. 7) or a mobile phone 71 (see FIG. 8). Furthermore, the receiving member 5 includes a shield 53. When the connector 40 is not been using temporarily, the shield 53 covers the connector 40 of the electrical connection unit 4. When the connector 40 begins to be used, the shield 53 is moved away. Therefore, the shield 53 provides a dustproof effect to the connector 40. The shield 53 includes a positioning portion 531 for engaging with a positioning groove 500 of the receiving member 5 when the shield 53 covers the connector 40. The shield 53 further includes a protruding actuator 532 for being actuated by a finger.

Figure 3:
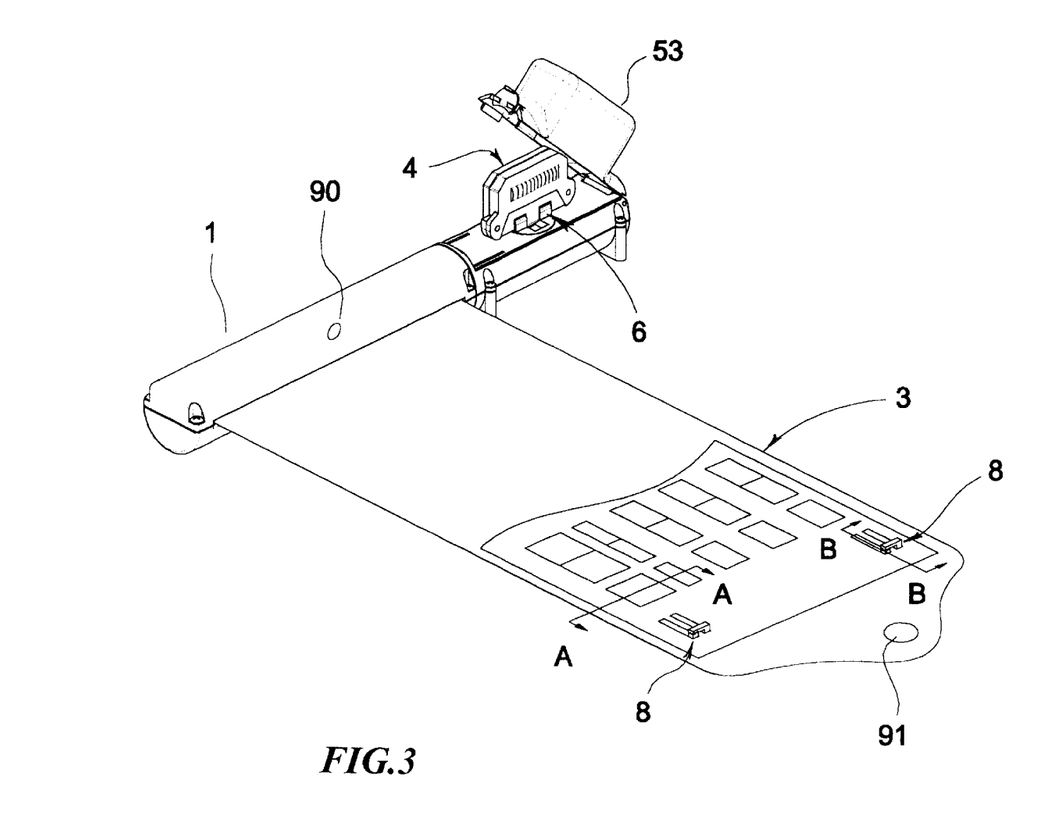
FIG. 3 is a perspective view of a pen-sized keyboard arrangement of the present invention when being used.
Figure 5:
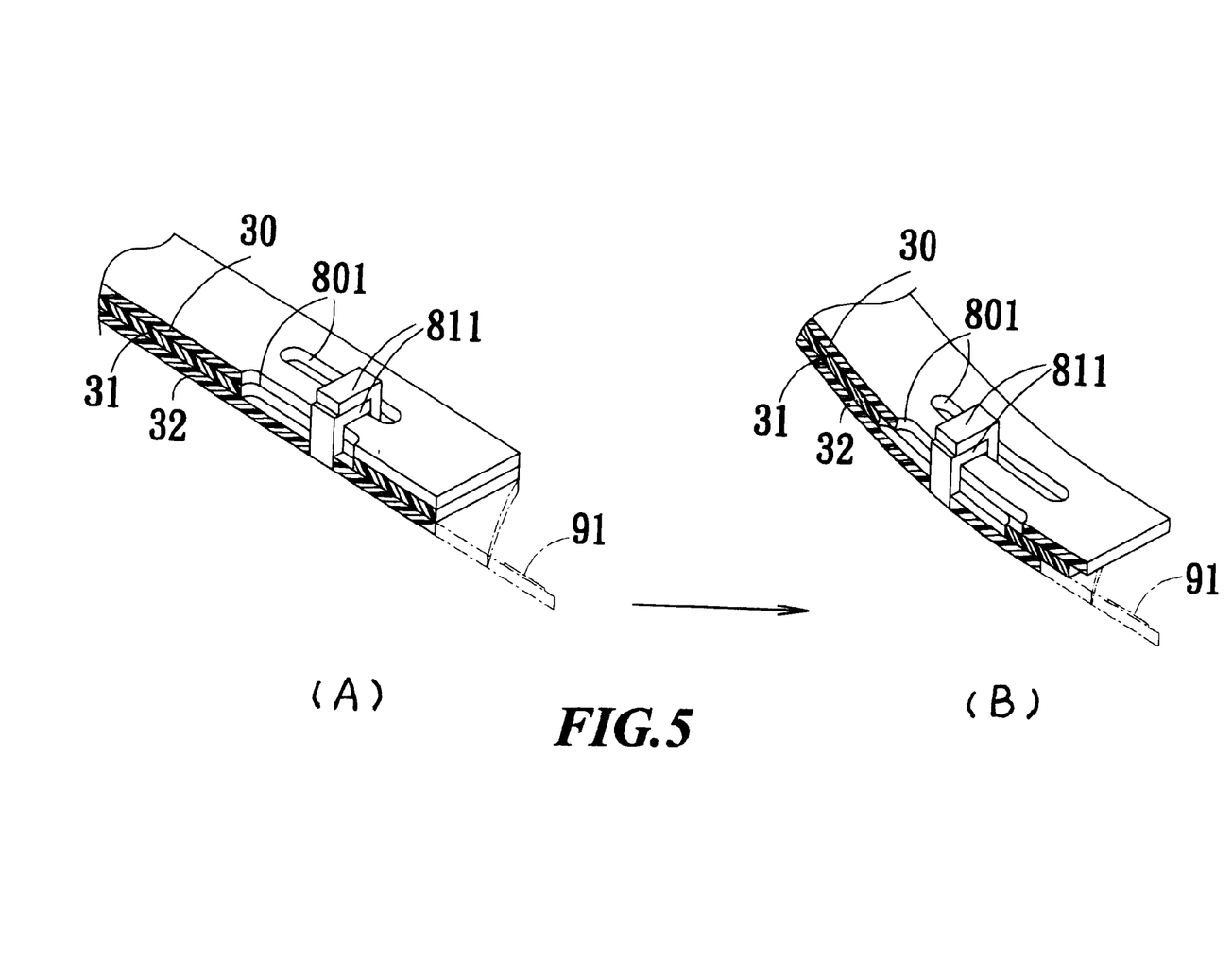
FIGS. 5A, 5B are cross-sectional views taken from line B—B of FIG. 3 to show the function of the buffer of those flexible layers.

In assembly, the mother board 33 is assembled within the rolling pole 21 and the receiving member 5. The flat cable 34 and the electrical wire 35 are electrically connected to the flexible PCB 30, 32. The stacked up flexible PCB 30, 32 and the film 31 are locked within the elongated groove 211 of the rolling pole 21. The front portion 331 of the mother board 33 is received within the rolling pole 21 and the rear portion 332 thereof is received within the receiving member 5. Before received within the housing 22, one edge of the keyboard member 3 is clipped and secured between the rolling pole 21. The housing 22 is assembled to the receiving member 5 by means of a plurality screws. The rotating mechanism is then assembled to the receiving member 5 and the shield 53 is pivotally connected to the receiving member 5. At last, referring to FIG. 3, the receiving member 5 is rotated thereby rolling in the stacked up the flexible PCB 30, the film 31, and the flexible PCB 32. The rolled-in flexible PCB 30, the film 31, and the flexible PCB 32 are received within housing 22. Referring to FIGS. 5A and 5B, the deformation made by the three rolled-in layers is absorbed by the structure of the elongated slots 801 and the tabs 811 at edge thereof. Therefore, the stacked-up flexible PCBs 30, 32, and the film 31 can be properly and reliably rolled in by the rotate movement of the receiving member 5. That is, the relative movement of the flexible PCBs 30, 32 and the film 31 can be absorbed by the structure of the elongated slots 801 and the tabs 811. After the stacked-up layers are rolled in, adhesive buttons 90, 91 formed at the outside surface of the housing 22 and the edge of the flexible PCB 32 are locked together thereby securing the rolled-in layers within the housing 22 (referring to FIG. 2).

Figure 6:
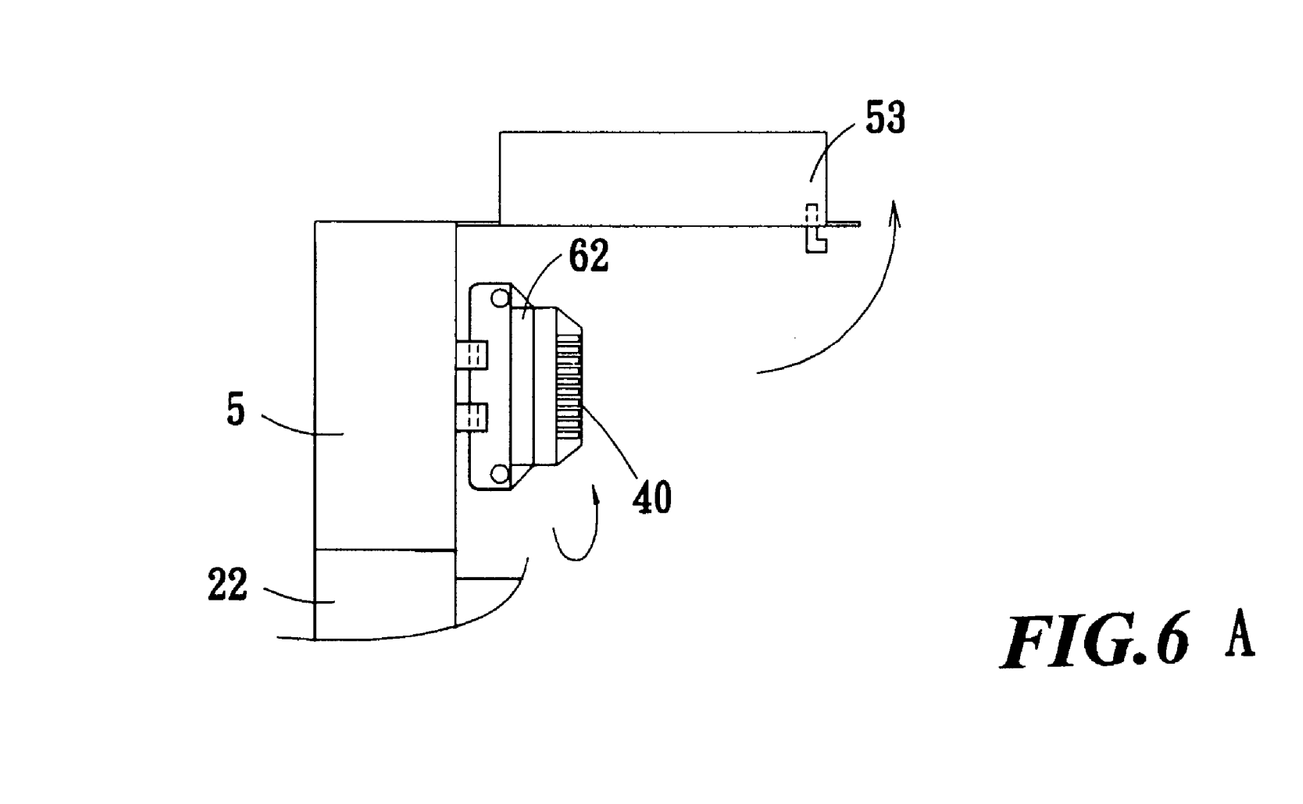
FIG. 6A, FIG. 6B, and FIG. 7 are different views of the pen-sized keyboard of the present invention when used with a PDA.
Figure 7:
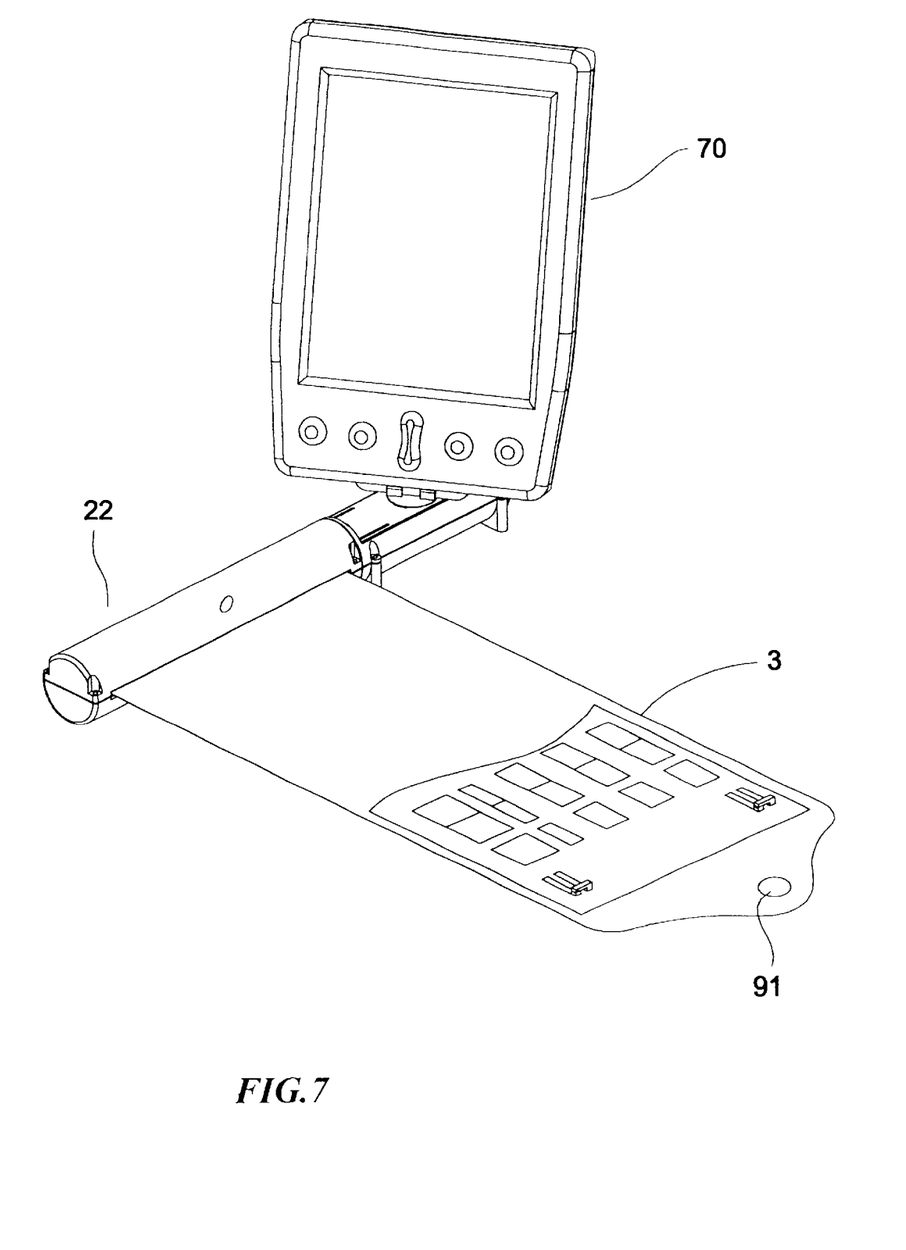
Figure 8:
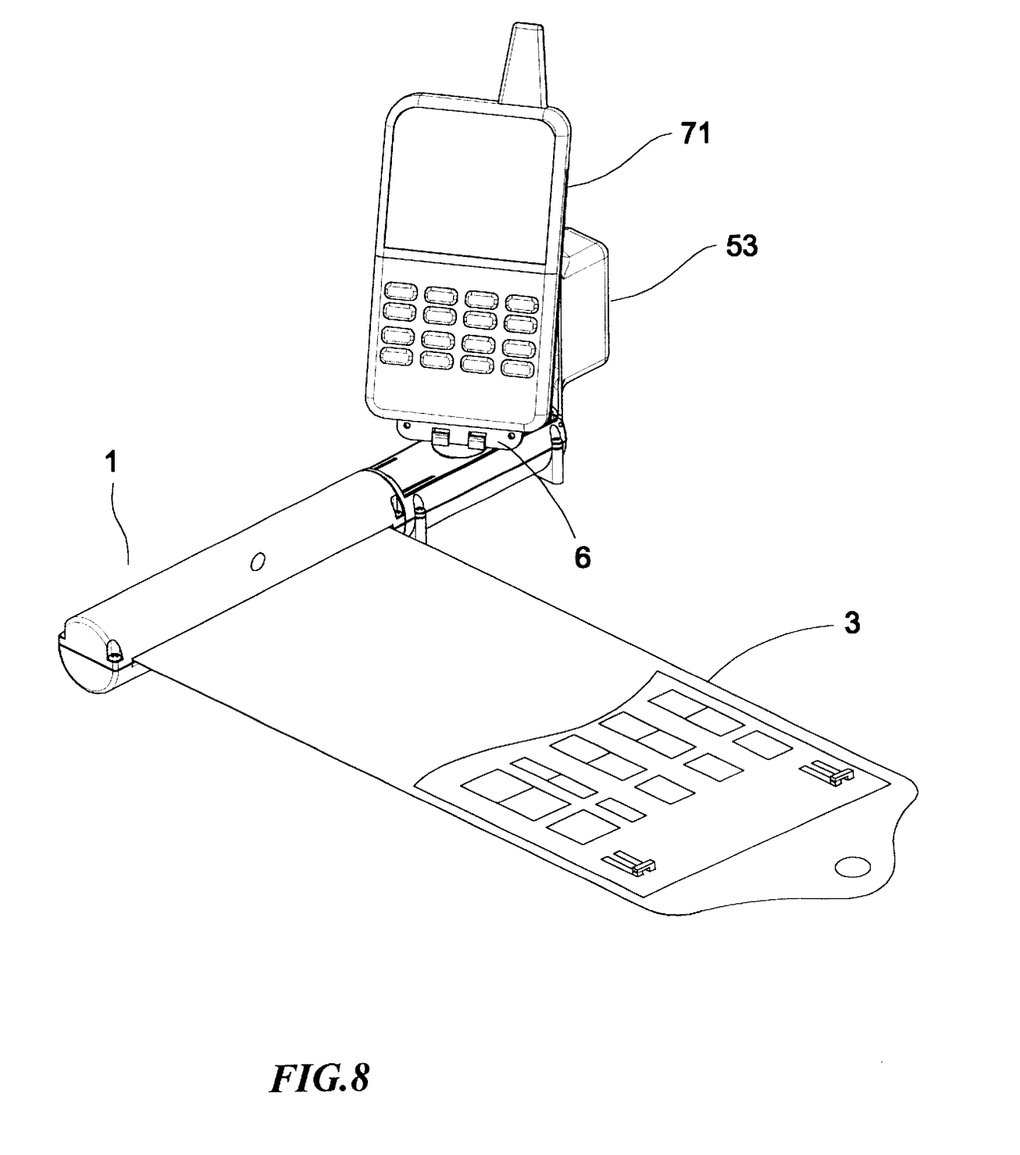
FIG. 8 is a perspective view of the pen-sized keyboard of the present invention when used with a mobile phone.

Also referring to FIGS. 6A, 6B, when being used, the keyboard member 3 is pulled out and the key-presses 301 are exploded. The shield 53 is rotated about 90 degree and moved away from the connector 40 (referring to FIG. 6A). The connector 40 fixed in the supporter 62 is rotated in a direction indicated by an arrow and about a desired angle relative to the housing 5. Referring to FIG. 6B, the broken lines indicate that the supporter 62 is rotated about a certain angle. Referring to FIG. 7, therefore, after connected with the connector 40, the PDA 70 can be viewed at a desired angle. The pulled-out keyboard member 3 includes the key-presses 301 which each have a similar dimension with the key-presses of a desktop computer thereby providing a desired feeling for operation. Similarly, referring to FIG. 8, when the connector 40 of the electrical connection unit 4 of the present invention is changed to a style for using with a mobile phone 71, the keyboard arrangement 1 of the present invention can also provide large key-presses of a keyboard for operating the mobile phone 71.

Figure 9:
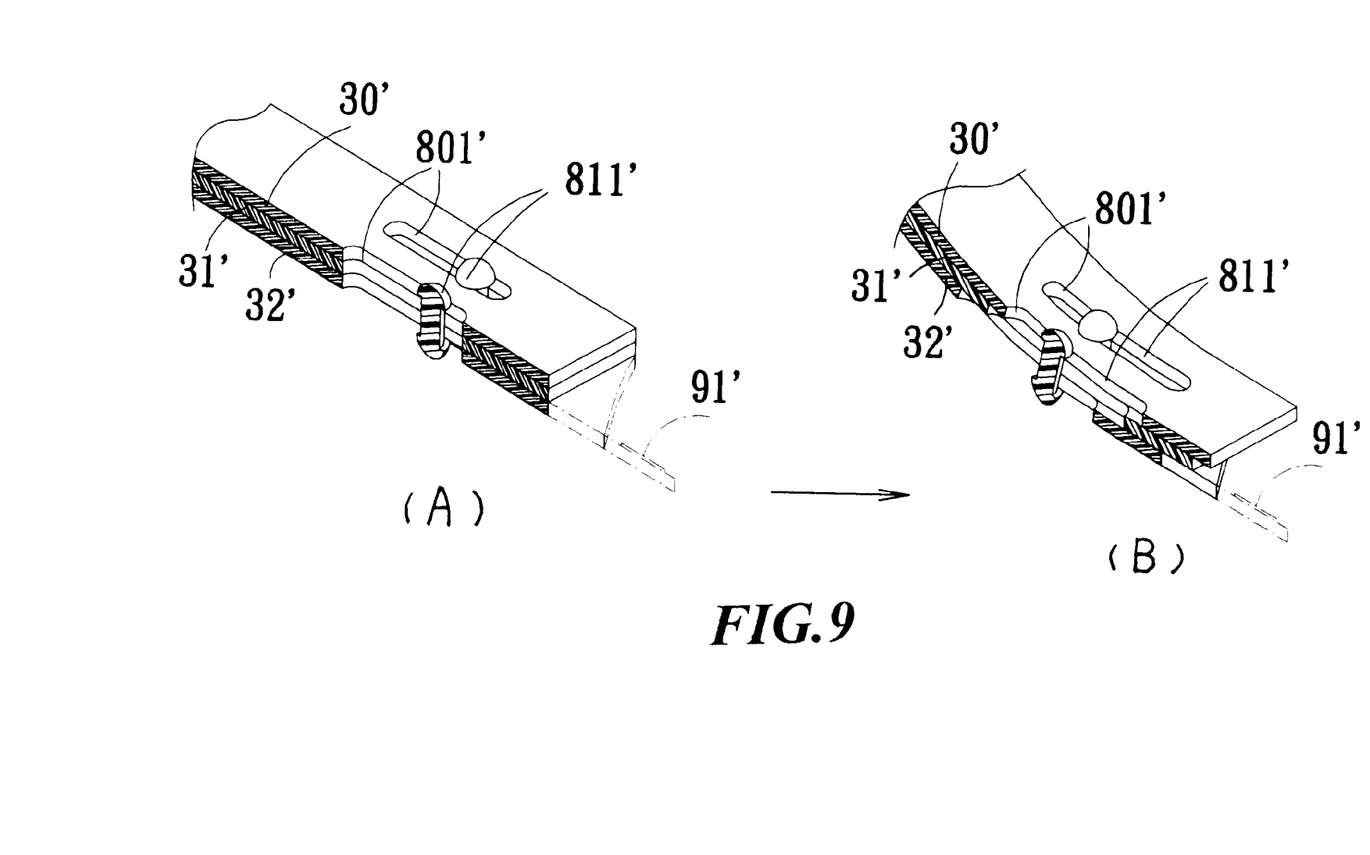
FIGS. 9A, 9B are partly enlarged and cross-sectional views of a buffer of the second embodiment of the present invention when positioned on the keyboard member.
Figure 10:
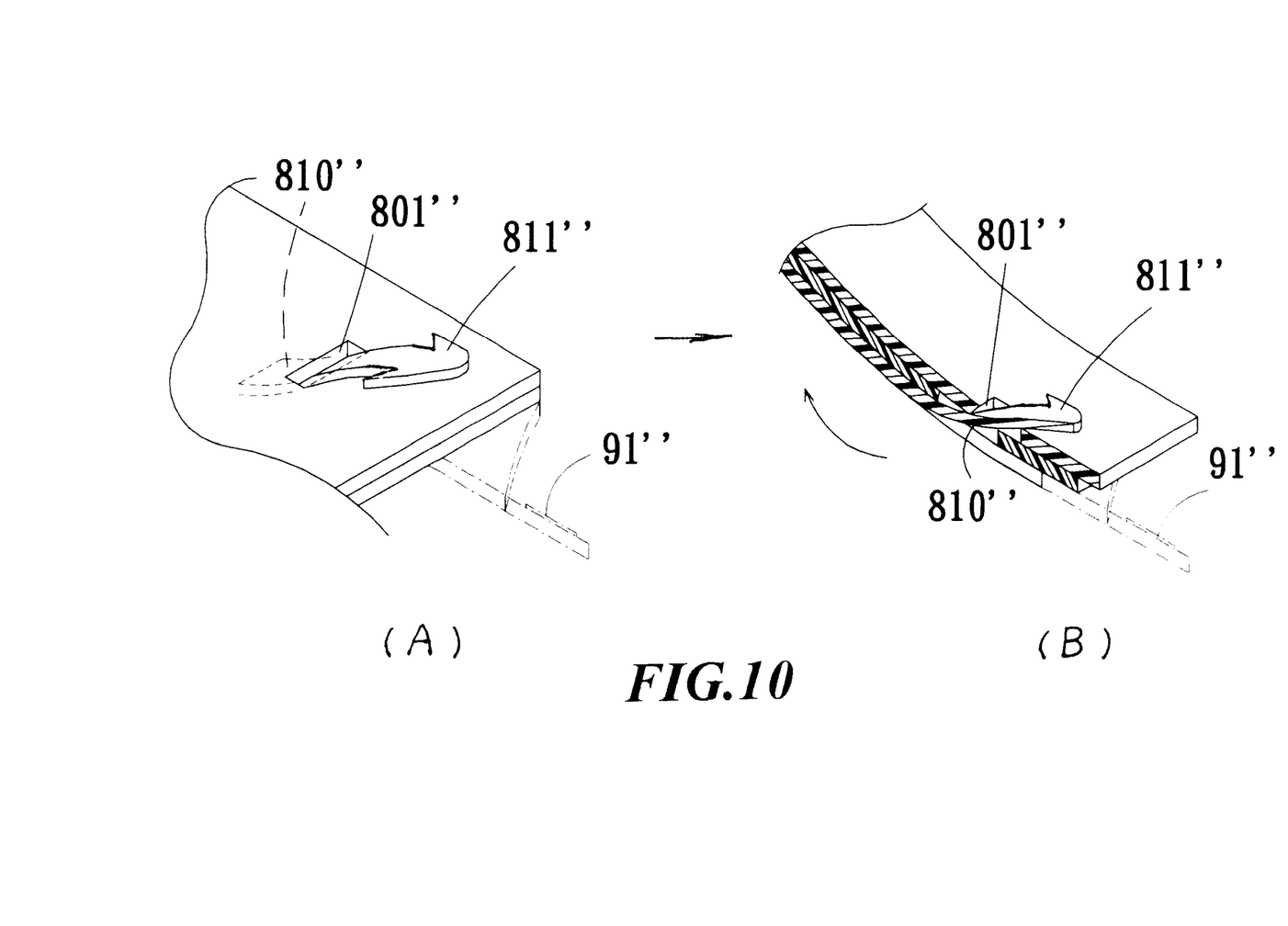
FIGS. 10A and 10B are partly enlarged and cross-sectional views of a buffer of the third embodiment of the present invention when positioned on the keyboard member.

Again, FIG. 9 and FIG. 10 are cutaway views of buffers of a second embodiment and a third embodiment of the present invention. Referring to FIG. 9, the slide slot of the buffer is a longitudinally elongated slot 801'. The lead portion is a screw 811'. The diameter of the screw 811' is similar to the width of the elongated slot 801'. The screw 811' extends through the flexible PCB 30', 32', and film 31'. The diameter of the screw 811' limits the direction of the movement of the flexible layers thereby absorbing the deformation of each of the flexible layers. Referring to FIG. 10, the positioning slide groove of the buffer 8" is a laterally extending elongated slot 801". A lead portion is a tab 810" with a locking barb upwardly extending from the lower flexible PCB 32". When the tab 810" extends through the elongated slot 810" of the upper flexible PCB 30" and the flexible film 31", the locking barb 811" of the tab 810" is locked by the slot 801" thereby limiting the movement of the locking barb 811". Therefore, the deformation of the flexible layers can be absorbed by such a structure.

Figure 11:
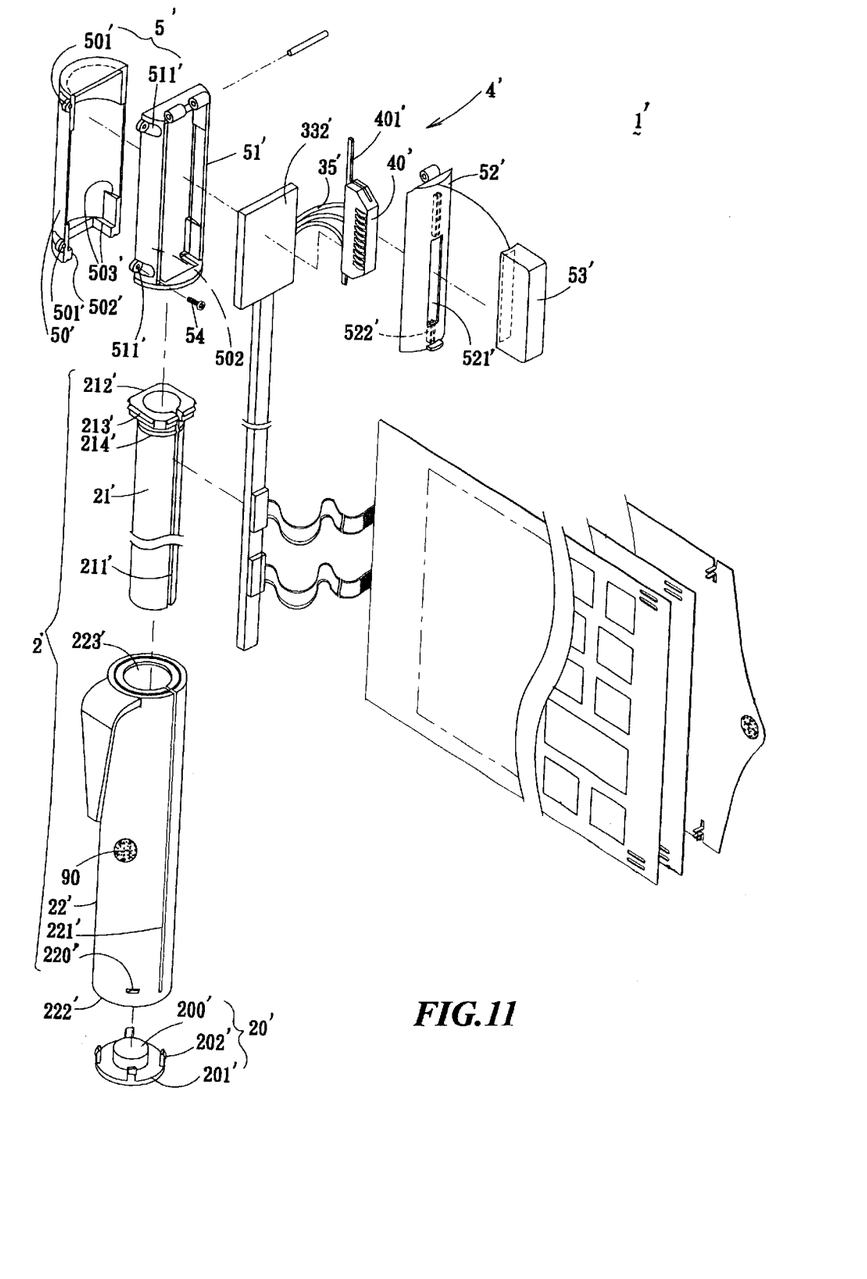
FIG. 11 is an exploded view of a rolling pole, a base, a receiving member and a housing with a cavity inside of the keyboard arrangement of the second embodiment of the present invention.

Also referring to FIG. 11, the pen-sized keyboard arrangement 1 of the second embodiment of the present invention comprises a base 20', a rolling pole 21' pivotally connected to the base 20', the cylinder-sized housing 22' with a cavity inside, an electrical connection unit 4', and a receiving member 5'. The base 20' includes a holder 200' and a base plate 201'. The holder 200' is engaged to one end of the rolling pole 21' so that the rolling pole 21' can be rotated relative to the holder 200'. The base plate 201' includes a plurality of locking barbs 202' for locking corresponding slots 220' of the housing 22' thereby securing the base plate 201' to the end of the housing 22'. The rolling pole 21' has an elongated cavity inside and defines a longitudinally extending elongated groove 211'. One end of the rolling pole 21' is pivotally connected to the base 20', and the other end thereof forms a square-shaped joint portion 212'. The joint portion 212' includes a flange 213' therearound and a flange 214' on the rolling pole 21' below the joint portion 212' for being properly connected to the receiving member 5'.

The housing 22' has a pair of openings at ends thereof in connection with the cavity thereinside. The housing 22' defines am elongated assembling slot 221' corresponding to the elongated groove 211'. One opening 222' is engaged to the base 20' as described before. The other opening 223' is engaged to the receiving member 5' as described later.

The receiving member 5' includes a first body 50', a second body 51', and a cover 52. The first body 50' and the second body 51' can be assembled together as one piece. The cover 52' is pivotally connected to the second body 51'. A pair of screw holders 501', 511'is positioned at an outside surface of the first body 50' and the second body 51'. A screw bolt 54' extends the screw holder 501', 511' thereby securing the first body 50' and the second body 51' together for receiving the mother board 33' of the keyboard member 3'. The cover 52' defines an elongated slot 521' for engaging with a connector 40' and a notch 522' for engaging with base bars 401' formed at opposite ends of the connector 40' thereby securing the connector 40' within the cover 52'.

Furthermore, a square-shaped assembling opening 502' is defined in the assembled first and second bodies 50', 51' and includes positioning grooves 503' for engaging with the flanges 213', 214' of the rolling pole 21' thereby assembling the receiving member 5' and the rolling pole 21' together. The joint portion 212' of the rolling pole 21' is engaged to the assembling opening 502' so that the rolling pole 21 is received and can be rotated within the receiving member 5' to roll in the flexible layers. The cover 52' of the receiving member 5' includes a shield 53'. When the connector 40' positioned on the elongated slot 521' of the cover 52' is not been using temporarily, the shield 53' covers the connector 40' of the receiving member 5'. When the connector 40' begins to be used, the shield 53' is moved away. Therefore, the shield 53' provides a dustproof effect to the connector 40'. Such a structure can satisfy the objects of the present invention. The housing 22' includes a hook formed on a surface of an end thereof far away from the base 20'and corresponding to a position where the cover 52' positions the connector 40'.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

What is claimed is:

1. A pen-sized keyboard arrangement, for being connected with a PDA, a mobile phone, and other information products, comprising:

a rolling mechanism including a base and a rolling pole pivotally connected with the base, the rolling pole defining an elongated cavity inside and defining a longitudinally extending elongated assembling groove therein, one end of the rolling pole being pivotally connected to the base, the other end thereof being rotated by a hand;

a keyboard member at least including a pair of flexible PCBs, a flexible film sandwiched by the PCBs, and a mother board electrically connected to the flexible PCBs, a plurality of key-presses being printed on one flexible PCB, a touch pad being positioned on the other flexible PCB corresponding to the key-presses;

a buffer being formed on each of the flexible layers to limit the movement direction of the flexible layers so that the flexible layers can only move in a direction of being rolled thereby absorbing the deformation of each flexible layer during the process of being rolled;

a housing with a cavity inside including a pair of openings at opposite ends thereof for receiving the base and the rolling pole, and defining an elongated assembling slot corresponding to the assembling groove of the rolling pole; and an electrical connection unit at least including a connector for being electrically connected from the keyboard member to an information product.

2. The pen-sized keyboard arrangement as described in claim 1, wherein one end of the rolling pole for being actuated is connected to a receiving member for receiving the mother board of the keyboard member and the connector of the electrical connection unit.

3. The pen-sized keyboard arrangement as described in claim 2, wherein the receiving member and the rolling pole integratedly formed with the receiving member includes a pair of longitudinally divided halves which can be assembled together by means of screws.

4. The pen-sized keyboard arrangement as described in claim 1, wherein the buffer includes a positioning slide groove positioned at an edge of each flexible layer of the keyboard member, and a lead portion positioned on one of the flexible PCBs for sliding within the slide groove in a desired direction.

5. The pen-sized keyboard arrangement as described in claim 4, wherein the slide groove includes a pair of side-by-side-arranged longitudinally extending elongated slots, the lead portion including a pair of tabs formed on the flexible PCB, the tabs extending through the elongated slots of the other two flexible layers and laterally extending toward each other to form a bridge structure for limiting the movement direction of the flexible layers, therefore, the flexible layers being only moveable in a direction in which the flexible layers being rolled and, the tabs being positioned above the upper flexible PCB.

6. The pen-sized keyboard arrangement as described in claim 4, wherein the slide groove include an elongated slot, the lead portion including a screw, the diameter of the screw being similar to the width of the elongated slot, the screw extending through the elongated slot of flexible layers, the diameter of the screw limiting the direction of the movement of the flexible layers thereby absorbing the deformation of each of the flexible layers.

7. The pen-sized keyboard arrangement as described in claim 4, wherein the slide groove includes a laterally extending elongated slot, the lead portion including a tab with a locking barb formed on the lower flexible PCB, the tab extending through the slide groove of the other two flexible layers and the locking barbs being securely located above the two flexible layers thereby limiting the movement of the flexible layers in a desired direction.

8. The pen-sized keyboard arrangement as described in claim 4, wherein the slide grooves includes a pair of side-side-arranged longitudinally extending elongated slot, the lead portion including a pair of tabs formed on the flexible PCB, the tabs extending through the slide grooves of the other two flexible layers and laterally extending toward each other to form a bridge structure for limiting the movement direction of the flexible layers, therefore, the flexible layers being only moveable in a direction in which the flexible layers being rolled and, the tabs being positioned above the upper flexible PCB.

9. The pen-sized keyboard arrangement as described in claim 4, wherein the slide grooves include elongated slots, the lead portion including a screw, the diameter of the screw being similar to the width of the elongated slot, the screw extending through the elongated slot of flexible layers, the diameter of the screw limiting the direction of the movement of the flexible layers thereby absorbing the deformation of each of the flexible layers.

10. The pen-sized keyboard arrangement as described in claim 9, wherein the housing includes a hook formed on a surface of an end thereof far away from the base and corresponding to a position where the cover positions the connector.

11. The pen-sized keyboard arrangement as described in claim 4, wherein the mother board of the keyboard includes a front portion and a rear portion, the front portion being received in the cavity of the rolling pole and being connected to the two flexible PCBs by a flat cable, the rear portion being received in the first and second body of the receiving member and being connected to the electrical connection unit by a flat wire.

12. The pen-sized keyboard arrangement as described in claim 11, wherein a plurality of adhesive buttons are formed at the outside surface of the housing and an inside surface of the flexible PCB adjacent to an edge of the flexible PCB.

13. The pen-sized keyboard arrangement as described in claim 12, wherein the housing includes a hook formed on a surface of a end thereof far way from the base and corresponding to a position where the cover positions the connector.

14. A pen-sized keyboard arrangement, for being electrically connected to a PDB, a mobile phone, and other information products, comprising:
   a rolling mechanism including a base and an elongated rolling pole pivotally connected to the base, the rolling pole including an elongated longitudinally extending assembling groove, one end of the rolling pole being pivotally connected to the base, the other end thereof being used for rotating the rolling pole and being connected with a receiving member;
   a keyboard member at least including a pair of flexible PCBs, a flexible film sandwiched by the flexible PCBs, and a mother board being connected to the flexible PCBs, one of the flexible PCBs being printed with a plurality of key-presses, the other one of the flexible PCBs being positioned with a plurality of touch pads corresponding to the key-presses, a plurality of holes being defined on the flexible film corresponding to the key-presses and the touch pads;
   a housing with a cavity inside including a pair of openings at opposite ends thereof for receiving the base and the rolling pole, and defining an elongated longitudinally extending assembling slot corresponding to the assembling groove of the rolling pole;
   an electrical connection unit being received in the receiving member for being electrically connected to the keyboard member and to an information product; and
   a rotating mechanism being positioned between the receiving member and the electrical connection unit and being used to rotate the electrical connection unit about a desired angle for being covered or rotate electrical connection unit about a desired angle relative to the housing about for being electrically connected to a PDA or a mobile phone thereby providing a desired view angle for a user.

15. The pen-sized keyboard arrangement as described in claim 14, wherein the rotating mechanism includes a depressed base, a rotating plate, and a supporter, the depressed base being positioned on the receiving member and including a lead indentation and a stopper, the rotating plate being pivotally engaged with the depressed base and rotateable along the lead indentation, the rotating plate including a protruding portion for engaging with the stopper and a passageway for pivotally engaging with the supporter, the supporter being used for fixing the electrical connection unit and including a pivotal pole pivotally connected to the passageway for being rotated about a desired angle.

16. The pen-sized keyboard arrangement as described in claim 15, wherein a stopping portion is formed adjacent to the passageway and a center of the rotating plate, the pivotal pole including a locking portion extending along a side thereof, the supporter being pivotally on the passageway and being rotateable about a desired angle when the locking portion is engaged with a stopping portion, thereby rotating the electrical connection unit about a desired angle for being properly connected with a PDA or a mobile phone.

17. The pen-sized keyboard arrangement as described in claim 16, wherein the housing includes a hook formed on a surface of an end thereof far away from the base and corresponding to a position where the cover positions the connector.

18. The pen-sized keyboard arrangement as described in claim 17, wherein a shield is formed at the receiving member, when the connector is not been using temporarily, the shield covering the connector of the receiving member, when the connector begins to be used, the shield being moved away, therefore, the shield providing a dustproof effect to the connector.

* * * * *